United States Patent
Corcoran et al.

(10) Patent No.: US 9,932,837 B2
(45) Date of Patent: Apr. 3, 2018

(54) LOW PRESSURE LOSS COOLED BLADE

(71) Applicant: United Technologies Corporation, Hartford, CT (US)

(72) Inventors: Christopher Corcoran, Manchester, CT (US); Jamie G. Ghigliotty, Cabo Rojo, PR (US); Rafael A. Perez, Arecibo, PR (US); Edward F. Pietraszkiewicz, Southington, CT (US)

(73) Assignee: United Technologies Corporation, Farmington, CT (US)

( * ) Notice: Subject to any disclaimer, the term of this patent is extended or adjusted under 35 U.S.C. 154(b) by 269 days.

(21) Appl. No.: 14/774,566

(22) PCT Filed: Mar. 11, 2014

(86) PCT No.: PCT/US2014/023709
§ 371 (c)(1),
(2) Date: Sep. 10, 2015

(87) PCT Pub. No.: WO2014/164888
PCT Pub. Date: Oct. 9, 2014

(65) Prior Publication Data
US 2016/0024936 A1 Jan. 28, 2016

Related U.S. Application Data

(60) Provisional application No. 61/776,417, filed on Mar. 11, 2013.

(51) Int. Cl.
*F01D 5/18* (2006.01)

(52) U.S. Cl.
CPC ............ *F01D 5/186* (2013.01); *F01D 5/187* (2013.01); *F05D 2220/32* (2013.01);
(Continued)

(58) Field of Classification Search
CPC ...... F01D 5/186; F01D 5/187; F05D 2220/32; F05D 2240/30; F05D 2260/202; F05D 2260/22141; Y02T 50/676
See application file for complete search history.

(56) References Cited

U.S. PATENT DOCUMENTS 4,278,400 A    7/1981  Yamarik et al.
5,462,405 A   10/1995  Hoff et al.
(Continued)

FOREIGN PATENT DOCUMENTS

EP   1070829 A2   1/2001
EP   1600604 A1  11/2005
EP   1923537 A2   5/2008

OTHER PUBLICATIONS

International Search Report, dated Jun. 24, 2014, for PCT Application No. PCT/US2014/023709, 3 pages.
(Continued)

*Primary Examiner* — Igor Kershteyn
(74) *Attorney, Agent, or Firm* — Kinney & Lange, P.A.

(57) ABSTRACT

A rotor blade comprises a root section, an airfoil section, a leading edge cooling cavity, an intermediate cooling cavity, and a trailing edge cooling cavity. The leading edge, intermediate, and trailing edge cooling cavities each extend spanwise through the airfoil section from a coolant inlet passage in the root section, and each terminate proximate the airfoil tip.

15 Claims, 3 Drawing Sheets

(52) U.S. Cl.
CPC .... *F05D 2240/30* (2013.01); *F05D 2260/202* (2013.01); *F05D 2260/22141* (2013.01); *Y02T 50/676* (2013.01)

(56) References Cited

U.S. PATENT DOCUMENTS

| | | | |
|---|---|---|---|
| 5,624,231 A | 4/1997 | Ohtomo et al. | |
| 5,695,322 A | 12/1997 | Jacobson et al. | |
| 5,975,851 A * | 11/1999 | Liang | F01D 5/186 415/115 |
| 6,672,836 B2 * | 1/2004 | Merry | F01D 5/187 415/178 |
| 7,066,716 B2 * | 6/2006 | Jacala | F01D 5/186 415/115 |
| 7,097,419 B2 * | 8/2006 | Lee | F01D 5/081 415/115 |
| 7,413,403 B2 * | 8/2008 | Cunha | B22C 9/10 164/369 |
| 7,665,968 B2 * | 2/2010 | Mongillo, Jr. | F01D 5/187 416/97 R |
| 7,695,243 B2 * | 4/2010 | Lee | F01D 5/188 415/115 |
| 8,167,536 B2 * | 5/2012 | Liang | F01D 5/187 415/115 |
| 8,790,083 B1 * | 7/2014 | Liang | F01D 5/186 416/97 R |
| 2003/0156943 A1 | 8/2003 | Strassberger et al. | |
| 2007/0140851 A1 | 6/2007 | Hooper et al. | |
| 2007/0253815 A1 | 11/2007 | Kopmels et al. | |
| 2008/0118366 A1 * | 5/2008 | Correia | F01D 5/187 416/97 R |

OTHER PUBLICATIONS

Extended European Search Report for EP Application No. 14779667.6, dated Jan. 5, 2017, 9 Pages.

* cited by examiner

LOW PRESSURE LOSS COOLED BLADE

BACKGROUND

The described subject matter relates generally to gas turbine engines, and more specifically to rotor blades for gas turbine engines.

Gas turbine engine airfoils, particularly those blades and vanes exposed to hot combustion products are provided with internal cooling cavities. To ensure circulation of coolant (e.g., air or steam) and provide sufficient convective cooling, the internal cooling cavities often include a serpentine portion through which the coolant is intended to make at least one full downward pass through the airfoil under most normal operating conditions.

Though well known and effective for various cooling applications, serpentine passages have relatively high pressure losses due to the need for the coolant to repeatedly change flow directions. Increased coolant pressure losses result in more coolant drawn from the engine working fluid to provide required airfoil cooling. This can increase parasitic losses and reduce engine efficiency. As such, a need has been identified for an internally cooled airfoil providing effective convective cooling and reduced pressure loss.

SUMMARY

A rotor blade comprises a root section, an airfoil section, a leading edge cooling cavity, an intermediate cooling cavity, and a trailing edge cooling cavity. The leading edge, intermediate, and trailing edge cooling cavities each extend spanwise through the airfoil section from a coolant inlet passage in the root section, and each terminate proximate the airfoil tip.

DETAILED DESCRIPTION

Figure 1:
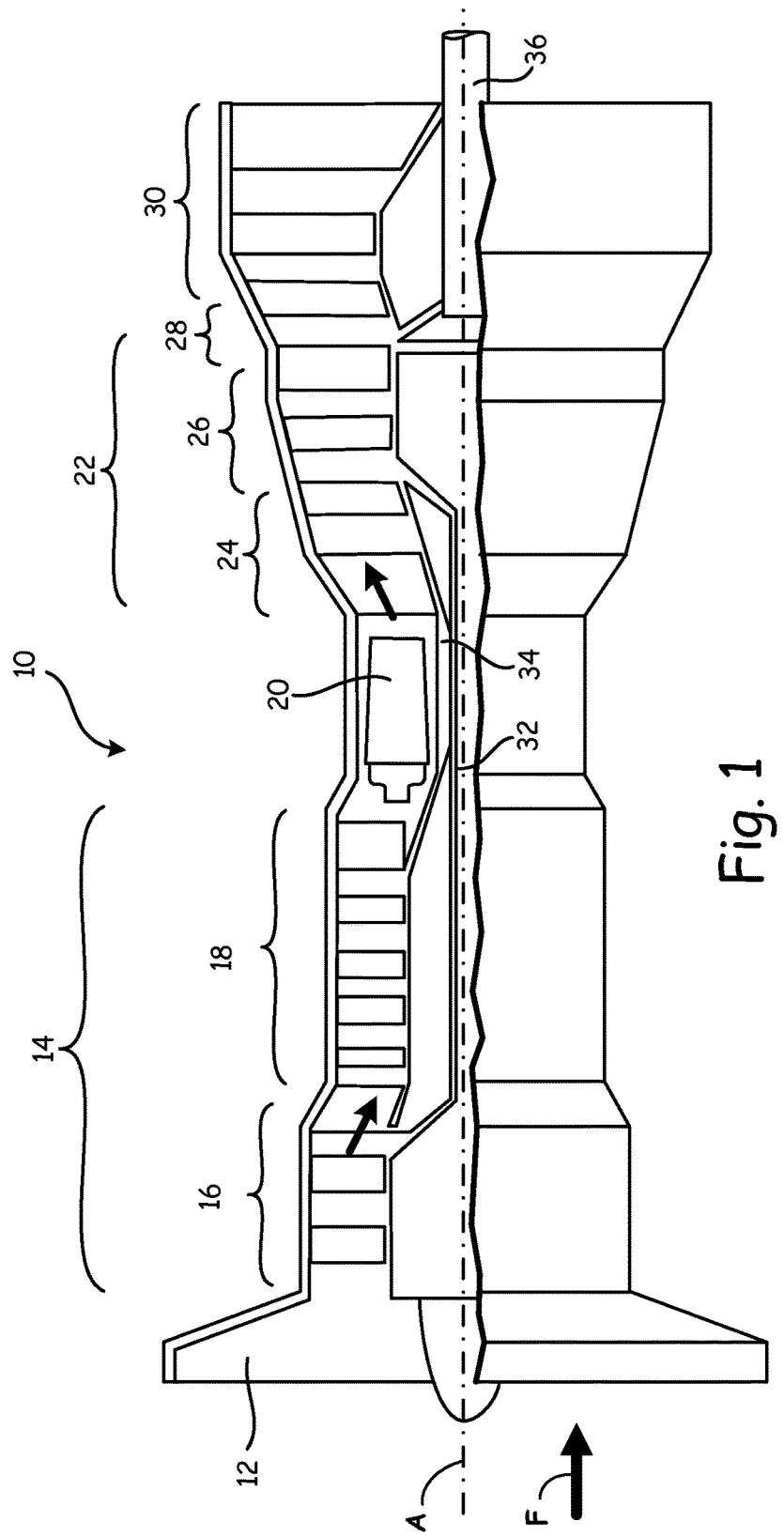
FIG. 1 schematically depicts an example gas turbine engine.

FIG. 1 is a simplified partial cross-sectional view of gas turbine engine 10, comprising inlet 12, compressor 14 (with low pressure compressor 16 and high pressure compressor 18), combustor 20, engine turbine 22 (with high pressure turbine 24 and low pressure turbine 26), turbine exhaust case 28, power turbine 30, low pressure shaft 32, high pressure shaft 34, and power shaft 36. Gas turbine engine 10 can, for instance, be an industrial power turbine.

Low pressure shaft 32, high pressure shaft 34, and power shaft 36 are situated along rotational axis A. In the depicted embodiment, low pressure shaft 32 and high pressure shaft 34 are arranged concentrically, while power shaft 36 is disposed axially aft of low pressure shaft 32 and high pressure shaft 34. Low pressure shaft 32 defines a low pressure spool including low pressure compressor 16 and low pressure turbine 26. High pressure shaft 34 analogously defines a high pressure spool including high pressure compressor 18 and high pressure compressor 24. As is well known in the art of gas turbines, airflow F is received at inlet 12, then pressurized by low pressure compressor 16 and high pressure compressor 18. Fuel is injected at combustor 20, where the resulting fuel-air mixture is ignited. Expanding combustion gasses rotate high pressure turbine 24 and low pressure turbine 26, thereby driving high and low pressure compressors 18 and 16 through high pressure shaft 34 and low pressure shaft 32, respectively. Although compressor 14 and engine turbine 22 are depicted as two-spool components with high and low sections on separate shafts, single spool or 3+ spool embodiments of compressor 14 and engine turbine 22 are also possible. Turbine exhaust case 28 carries airflow from low pressure turbine 26 to power turbine 30, where this airflow drives power shaft 36. Power shaft 36 can, for instance, drive an electrical generator, pump, mechanical gearbox, or other accessory (not shown).

Figure 2:
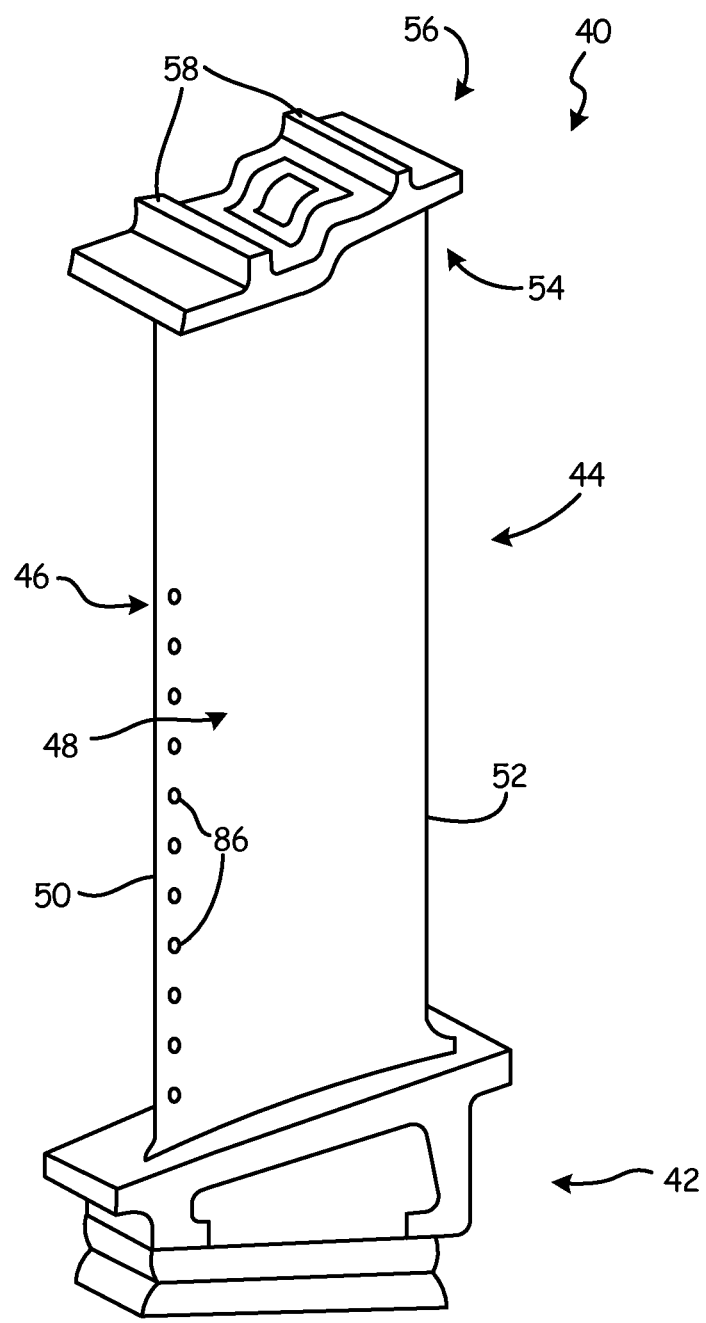
FIG. 2 is a perspective view of a rotor blade for the example gas turbine engine shown in FIG. 1.

FIG. 2 shows an example rotor blade 40. Rotor blade 40 is described as a blade suitable for use as part of a low pressure turbine rotor assembly in an industrial gas turbine engine. However, various embodiments of rotor blade 40 can additionally and/or alternatively be installed into one or more locations in example gas turbine engine 10 (shown in FIG. 1), including low pressure compressor 16, high pressure compressor 18, high pressure turbine 24, low pressure turbine 26, and/or power turbine 30. Embodiments of rotor blade 40 can also be incorporated into various turbine sections of other gas turbine engines including but not limited to turbofans, turbojets, and/or turboshafts providing propulsive power to aircraft, as well as other land-based turbine-based engines.

In the example embodiment shown in FIG. 2, rotor blade 40 includes root section 42 joined to airfoil section 44. Airfoil section 44 can include suction sidewall 46 and pressure sidewall 48 each extending chordwise between leading edge 50 and trailing edge 52. Suction sidewall 46 and pressure sidewall 48 each extend spanwise between root section 42, and airfoil tip 54. In certain embodiments, tip shroud 56 is joined to airfoil tip 54 to reduce or alter vibrational modes of rotor blade 40. Tip shroud 56 optionally includes one or more knife edges 58 adapted to engage an abradable surface disposed, for example, on an outer casing and/or an outer air seal to prevent tip leakage. In alternative embodiments, tip shroud 56 can be replaced with one or more tip features such as a tip shelf, tip recess, or squealer rib.

Figure 3:
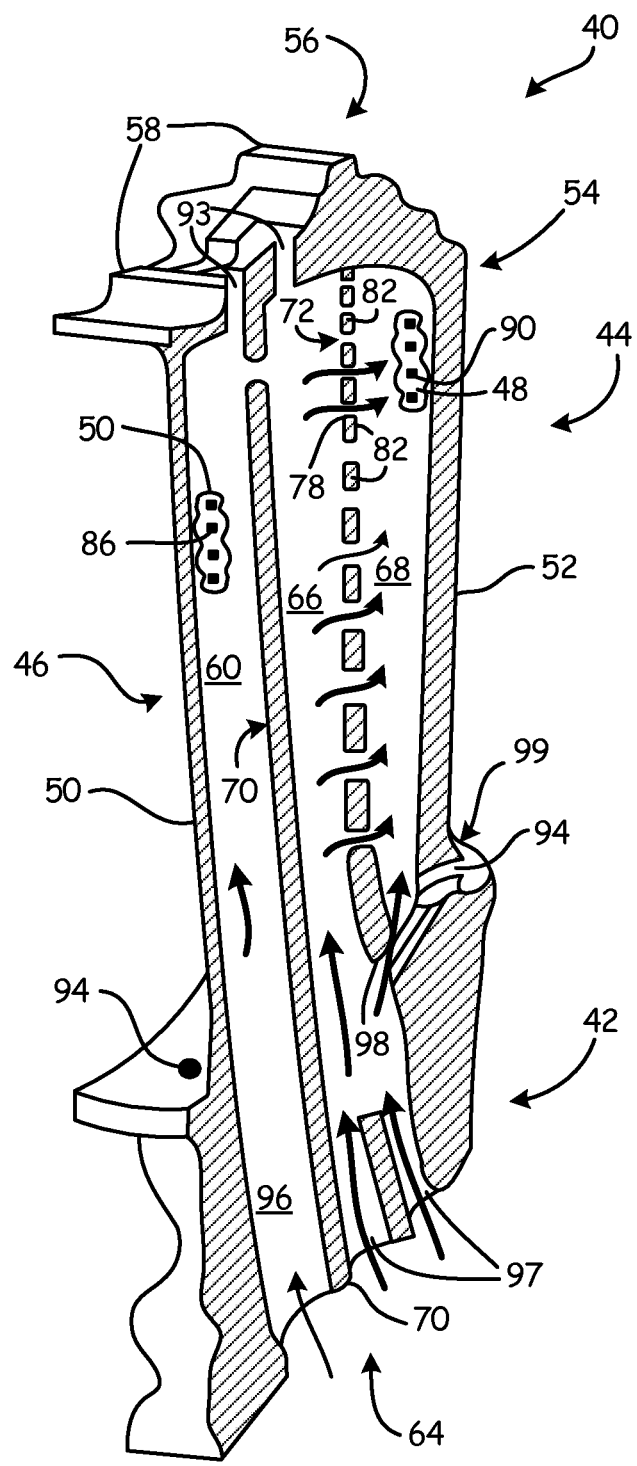
FIG. 3 shows a cooling scheme for the example rotor blade shown in FIG. 2.

FIG. 3 is a sectional view of rotor blade 40, showing one example embodiment of a low pressure loss cooling scheme. Leading edge cooling cavity 60 extends spanwise from coolant inlet passage 64 through airfoil section 44. Intermediate cooling cavity 66 is disposed aft of leading edge cavity 60, and also extends spanwise through airfoil section 44 from coolant inlet passage 64. Trailing edge cooling cavity 68 is in turn disposed aft of intermediate cooling cavity 66, and also extends spanwise through airfoil section 44 from coolant inlet passage 64. Each of leading edge cooling cavity 60, intermediate cooling cavity 66, and trailing edge cooling cavity 68 terminate proximate airfoil tip 54.

First rib 70 is disposed between leading edge cooling cavity 60 and intermediate cooling cavity 66. Second rib 72 is disposed between intermediate cooling cavity 66 and trailing edge cooling cavity 66. In certain embodiments, one or both of first rib 70 and second rib 72 can extend spanwise through substantially all of airfoil section 44 between root section 42 and airfoil tip 54 to substantially separate each of the cooling cavities 60, 66, 68 into individual up-pass cavities. The portion of leading edge cooling cavity 60 in airfoil section 44 can be bounded by one or more of airfoil leading edge 50, first rib 70, and at least one of suction sidewall 46 and pressure sidewall 48. A similar portion of intermediate cooling cavity 66 in airfoil section 44 can be bounded by first rib 70, second rib 72, and at least one of suction sidewall 46 and pressure sidewall 48. Trailing edge cooling cavity 68 can be bounded by second rib 72, trailing edge 52, and at least one of suction sidewall 46 and pressure sidewall 48. First rib 70 and/or second rib 72 separates the cooling flows through airfoil section 44 into discrete, generally upward-flowing cooling cavities, reducing the pressure losses associated with relying primarily on serpentine-shaped cooling cavities which require the coolant to change direction multiple times as it passes through the airfoil.

To ensure sufficient coolant flow and convective cooling of airfoil section 44, crossover holes 78 can be formed through one or both of first rib 70 and second rib 72 to connect adjacent cooling cavities 60, 66, 68. At least one crossover hole 78 can be disposed proximate airfoil tip 54. Crossover holes 78 can be cast along with the internal cavities through first rib 70 and/or second rib 72. In certain embodiments, crossover holes 78 can take the form of a plurality of gaps disposed between a corresponding plurality of rib segments 82. As shown in FIG. 3, rib segments 82 are aligned in a generally spanwise direction between root section 42 and airfoil tip 54 to form at least a portion of second rib 72. The height, or spanwise dimension of each of the plurality of rib segments 82 can be made to vary progressively according to a proximity of the respective rib segment 82 to airfoil tip 54. For example, as seen in FIG. 3, shorter rib segments 82 are located proximate airfoil tip 54, while longer rib segments 82 are disposed proximate root section 42.

To enhance internal and external cooling, and to allow for cycling of coolant through cavities 60, 66, 68, rotor blade 40 can also include a plurality of cooling apertures. FIG. 3 shows a plurality of film cooling holes 86 at leading edge 50 in communication with leading edge cooling cavity 66. In certain embodiments, at least some of film cooling holes 86 are arranged into at least one row along a stagnation line of airfoil section 44. Additionally or alternatively, a plurality of trailing edge cooling apertures 90 can be formed through one or both sidewalls proximate trailing edge 52. In certain embodiments, the plurality of trailing edge cooling apertures 90 can include at least one row of cooling holes or slots disposed along pressure sidewall 48 proximate trailing edge 52. Trailing edge cooling apertures 90 can be in communication with trailing edge cooling cavity 68. Rotor blade 48 can also optionally include one or more tip cooling holes 93 and/or one or more platform cooling holes 94.

FIG. 3 shows coolant inlet passage 64 with first feed passage 96 in communication with leading edge cavity 60 and second feed passage 97 in communication with intermediate cavity 66. In embodiments where second rib 72 converges with root section 42 proximate trailing edge fillet 99, a refresher or feed hole 98 can be provided through second rib 72 or between rib segments 82. This can allow communication of higher pressure coolant from second feed passage 97 into trailing edge cooling cavity 68. FIG. 3 shows the ability of first feed passage 96 and second feed passage 97 to each provide coolant independently to leading edge cooling cavity 60 and intermediate cooling cavity 66. In this instance, first rib 70 continues through both root section 42 and airfoil section 44, with the only communication between leading edge cooling cavity 60 and intermediate cooling cavity 66 being one or more crossover holes 78. However, it will be appreciated that other arrangements of coolant inlet passage 64 can also be adapted to provide sufficient coolant flow to one or more of cavities 60, 66, 68.

Although the present invention has been described with reference to preferred embodiments, workers skilled in the art will recognize that changes may be made in form and detail without departing from the spirit and scope of the invention.

The invention claimed is:

1. A rotor blade comprising:
    a root section including a first coolant inlet passage;
    an airfoil section including a suction sidewall and a pressure sidewall each extending chordwise between a leading edge and a trailing edge, and extending spanwise between the root section and an airfoil tip;
    a leading edge radial cooling cavity extending spanwise through the airfoil section from the first coolant inlet passage and terminating proximate the airfoil tip;
    an intermediate radial cooling cavity disposed aft of the leading edge radial cavity and extending spanwise through the airfoil section from the coolant inlet passage and terminating proximate the airfoil tip;
    a trailing edge radial cooling cavity disposed aft of the intermediate radial cavity and extending spanwise through the airfoil section from the coolant inlet passage, and terminating proximate the airfoil tip;
    a first rib disposed between the leading edge radial cooling cavity and the intermediate radial cooling cavity; and
    a second rib disposed between the intermediate radial cooling cavity and the trailing edge radial cooling cavity;
    wherein the first rib and the second rib extend spanwise through substantially all of the airfoil section between the root section and the airfoil tip;
    wherein the first rib is solid along its length except for at least one crossover hole disposed proximate the airfoil tip.

2. The rotor blade of claim 1, wherein the leading edge cooling cavity in the airfoil section is bounded by the airfoil leading edge, the first rib, and at least one of the suction sidewall and the pressure sidewall.

3. The rotor blade of claim 1, wherein the second rib includes a plurality of crossover holes distributed spanwise between the root section and the airfoil tip.

4. The rotor blade of claim 3, wherein the second rib comprises a plurality of rib segments aligned in a generally spanwise direction between the root section and the airfoil tip, spaces between adjacent ones of the plurality of rib segments defining at least some of the plurality of crossover holes.

5. The rotor blade of claim 4, wherein a spanwise dimension of each of the plurality of rib segments varies according to a proximity of the respective rib segment to the airfoil tip.

6. The rotor blade of claim 1, wherein the intermediate cooling cavity in the airfoil section is bounded by the first spanwise rib, the second spanwise rib, and at least one of the suction sidewall and the pressure sidewall.

7. The rotor blade of claim 6, wherein the trailing edge cooling cavity in the airfoil section is bounded by the second spanwise rib, the trailing edge, and at least one of the suction sidewall and the pressure sidewall.

8. The rotor blade of claim 1, further comprising:
    a shroud section joined to the airfoil tip.

9. The rotor blade of claim 1, further comprising:
    a plurality of leading edge cooling apertures in communication with the leading edge cooling cavity.

10. The rotor blade of claim 9, wherein the plurality of leading edge cooling apertures includes at least one row of film cooling holes arranged along a stagnation line of the airfoil section.

11. The rotor blade of claim 1, further comprising:
   a plurality of trailing edge cooling apertures in communication with the trailing edge cooling cavity.

12. The rotor blade of claim 11, wherein the plurality of trailing edge cooling apertures includes at least one row of cooling slots disposed along the pressure sidewall proximate the trailing edge.

13. The rotor blade of claim 1, wherein the coolant inlet passage comprises:
   a first feed passage in communication with the leading edge cavity; and
   a second feed passage in communication with the intermediate cavity.

14. The rotor blade of claim 13, wherein the first feed passage is separate from the second feed passage.

15. The rotor blade of claim 13, wherein the second feed passage is also in communication with the trailing edge cavity.

\* \* \* \* \*